(12) United States Patent
Watanabe et al.

(10) Patent No.: US 7,776,389 B2
(45) Date of Patent: Aug. 17, 2010

(54) METHOD FOR PRODUCING ANTI-GLARE FILM

(75) Inventors: Hitoshi Watanabe, Miyagi (JP); Yumi Haga, Miyagi (JP); Tsutomu Nagahama, Miyagi (JP); Shinichi Matsumura, Miyagi (JP)

(73) Assignee: Sony Corporation, Tokyo (JP)

( * ) Notice: Subject to any disclaimer, the term of this patent is extended or adjusted under 35 U.S.C. 154(b) by 145 days.

(21) Appl. No.: 12/048,959

(22) Filed: Mar. 14, 2008

(65) Prior Publication Data

US 2008/0206458 A1 Aug. 28, 2008

(30) Foreign Application Priority Data

Mar. 14, 2007 (JP) ............................. 2007-064553
Jan. 10, 2008 (JP) ............................. 2008-003463

(51) Int. Cl.
*B05D 5/06* (2006.01)

(52) U.S. Cl. ..................................................... 427/162

(58) Field of Classification Search ...... 427/162–163.2; 359/601
See application file for complete search history.

(56) References Cited

U.S. PATENT DOCUMENTS 6,773,122 B2   8/2004   Miyazaki et al.
7,567,383 B2 *  7/2009   Nagahama et al. .......... 359/599
2003/0063387 A1   4/2003   Miyazaki et al.
2005/0255291 A1 * 11/2005   Iwata et al. ................. 428/141

FOREIGN PATENT DOCUMENTS

| JP | 07-104108 | 4/1995 |
| JP | 1995-290652 | 7/1995 |
| JP | 2003-107205 | 4/2003 |
| JP | 2003-266580 | 9/2003 |
| JP | 2006-106224 | 4/2006 |
| JP | 2006-116805 | 5/2006 |
| JP | 2006-154838 | 6/2006 |
| JP | 2007-041533 | 2/2007 |
| JP | 2007-187746 | 7/2007 |

* cited by examiner

*Primary Examiner*—David Turocy
*Assistant Examiner*—Elizabeth Burkhart
(74) *Attorney, Agent, or Firm*—K&L Gates LLP

(57) ABSTRACT

A method for producing an anti-glare film includes applying a coating composition including at least a resin, a solvent, and fine particles to a substrate; drying the coating composition applied to the substrate so that a Benard cell structure is formed in the surface of the coating layer due to convection caused during volatilization of the solvent; and curing the resin contained in the coating composition having formed therein a Benard cell structure to form an anti-glare layer having fine irregularities with a moderate surface waviness. The anti-glare layer has a degree of white muddiness of 1.7 or less, as measured by quantitatively determining a diffuse reflection component of the diffused light incident upon the surface of the anti-glare layer.

15 Claims, 5 Drawing Sheets

METHOD FOR PRODUCING ANTI-GLARE FILM

CROSS-REFERENCE TO RELATED APPLICATIONS

The present application claims priority to Japanese Patent Application No. 2007-064553 filed in the Japanese Patent Office on Mar. 14, 2007 and Japanese Patent Application No. 2008-3463 filed in the Japanese Patent Office on Jan. 10, 2008, the entire content of which is incorporated herein by reference.

BACKGROUND

The present invention relates to a method for producing an anti-glare film. More particularly, the present invention relates to a method for producing an anti-glare film for use in the display surface of a display device, such as a liquid crystal display device.

In display devices such as liquid crystal display devices, a technique in which an anti-glare film is formed on the display side and light is diffused by the film to impart anti-glare properties to the display device or to reduce reflection in the surface of the display device is employed. A known anti-glare film imparts anti-glare properties to a display device by virtue of fine irregularities formed in the surface of the film.

FIG. 8 shows the construction of a known anti-glare film 101. The anti-glare film 101 has a substrate 111 and an anti-glare layer 112 formed on the substrate 111. The anti-glare layer 112 includes a resin containing fine particles 113 composed of amorphous silica or resin beads, and the fine particles 113 protrude from the surface of the anti-glare layer 112 to form fine irregularities in the surface. The anti-glare film 101 is formed by applying a coating composition including the fine particles 113, a resin, a solvent, and others to the substrate 111 and drying the coating composition applied.

The method in which a coating composition containing the fine particles 113 is applied to a substrate to produce an anti-glare film is inexpensive and provides good productivity, and whereby the producing method is widely used. However, while the resultant anti-glare film 1 has anti-glare properties, the protrusion shape of the individual fine particles 113, which form surface irregularities of the film, increase the haze value of the surface to cause the image to be whitish, whereby the contrast is lowered and the image definition is also lowered.

The anti-glare film is formed as the uppermost layer on the display side of the liquid crystal display device, and hence is required to have hardness suitable for a hard coat. As a result, it would be desirable to have a thickness as large as several micrometers to several tens micrometers so that an influence of the substrate 111 is not exerted. For forming protrusions of the fine particles 113 in the surface of the anti-glare layer 112 having such a thickness, it would be necessary that fine particles having a particle diameter as large as the thickness of the layer is added. The use of the fine particles having such a large particle diameter causes increasing the appearance of glare (scintillation) on the surface of the anti-glare layer 112, whereby the visibility of the display surface is lowered.

Under the circumstances, as shown in FIG. 9, the packing ratio of the fine particles 113 in the anti-glare layer 112 is reduced to increase the period of the surface irregularities of the anti-glare layer 112, thus improving the contrast. However, in the anti-glare layer 112 having a lengthened period of the surface irregularities to have a moderate irregularities, flat portions are formed between the individual protrusions of the fine particles 113, so that the anti-glare properties of the film become poor.

The anti-glare properties and high contrast are contrary to each other, and it is difficult to achieve both the properties. For achieving both anti-glare properties and high contrast and preventing scintillation, a method in which the surface irregularities of the anti-glare layer are controlled by shape transfer has been proposed.

For example, Japanese Unexamined Patent Application Publication No. 2003-107205 (hereinafter referred to as "Patent Document 1") discloses a method for producing a shape forming film having desired irregularities using an excimer laser beam processing apparatus. Japanese Unexamined Patent Application Publication No. 2006-154838 (hereinafter referred to as "Patent Document 2") discloses a method for producing a shape forming film having desired surface irregularities by coating matted polyethylene terephthalate (PET) with a resin. An anti-glare film is produced by, using the shape forming film formed by the above method, transferring desired irregularities to an ultraviolet-curable resin applied onto a substrate, and separating the shape forming film and then curing the resin by ultraviolet irradiation.

However, in the method for forming a shape forming film by laser beam processing described in the patent document 1, the cost of apparatus is high particularly in processing for a large area, e.g., television, and it is difficult to keep high accuracy of processing for the whole area. Further, the production of an anti-glare film by a shape transfer process includes placing an ultraviolet-curable resin in a die and curing the resin and separating the cured resin, and hence the line speed is not easily increased and the mass-productivity is poor.

On the other hand, the method in which a coating composition containing fine particles is applied to a substrate is inexpensive and provides a good productivity as described above, but an anti-glare film having both anti-glare properties and high contrast is difficult to obtain. For solving the problems of contrast or scintillation, the protrusions of fine particles are covered with a resin so that the anti-glare layer has a flat surface, but, in this case, it is difficult to prevent the reflection in the surface of the anti-glare layer, thus reducing the anti-glare properties. In other words, it is difficult to achieve both anti-glare properties and high contrast by controlling the fine irregularities in the surface of the anti-glare layer.

SUMMARY

Accordingly, it is desirable to provide a method which produces an anti-glare film having both excellent anti-glare properties and excellent contrast with high productivity at low cost.

The present inventors have conducted studies on the method for producing an anti-glare film having both anti-glare properties and high contrast using a process in which a coating composition containing fine particles is applied to a substrate. As a result, it is found that, not by a method in which light scattering by protrusions of the individual fine particles protruding from the surface of the anti-glare layer is controlled, by a method in which, utilizing Marangoni convection due to the non-uniform distribution of surface tension (non-uniformity in surface tension) caused during volatilization of the solvent contained in the coating composition, a Benard cell structure is formed by the convection in the coating composition and meniscuses of a liquid resin formed in the Benard cells allow moderate waviness irregularities to be formed in the surface of the anti-glare layer, an anti-glare film having both anti-glare properties and high contrast can be obtained.

In accordance with an embodiment, there is provided a method for producing an anti-glare film, wherein the method includes the steps of: applying a coating composition to a substrate, the coating composition including at least a resin, a solvent, and fine particles; drying the coating composition applied to the substrate to form a Benard cell structure in a surface of the coating layer by convection caused during volatilization of the solvent; and curing the resin contained in the coating composition including the formed Benard cell structure to form an anti-glare layer having fine irregularities with a moderate surface waviness. The anti-glare layer has a degree of white muddiness of 1.7 or less, as measured by quantitatively determining a diffuse reflection component of the diffused light incident upon the surface of the anti-glare layer.

According to an embodiment, Benard cells are formed by the fine particles aggregated on the plane to form fine irregularities with a moderate waviness in the surface of the anti-glare layer, so that an appearance of white muddiness in the resultant anti-glare film can be reduced while diffusing light.

If the difference between the surface energy of the fine particles and the surface tension of the solvent is small, the fine particles are three-dimensionally agglomerated markedly during the drying to form large irregularities in the surface, and the resultant film has high anti-glare properties along with scintillation, and low contrast. If the difference is larger, Benard cells are formed by the fine particles arranged on the plane also after the drying to form moderate waviness, and the resultant film has low anti-glare properties and high contrast. If the difference is further larger, Benard cells are unlikely to be formed in the surface after the drying, and the resultant film has many flat portions and hence has low anti-glare properties. Thus, for achieving anti-glare properties while having the above relationship, it would be necessary that the coating composition is coated at a thickness smaller than the particle diameter of the fine particles, and for eliminating flat portions, it would be necessary that the fine particles are added in a large amount. As a result, the resultant film becomes to have a large degree of white muddiness and low contrast. By appropriately selecting the combination of fine particles and a solvent so that the difference between the surface energy of the fine particles and the surface tension of the solvent falls in a specific range, the fine particles can be appropriately agglomerated on the plane, making it possible to form a moderate surface waviness.

Additional features and advantages are described herein, and will be apparent from the following Detailed Description and the figures.

DETAILED DESCRIPTION

The present application will be described with reference to the accompanying drawings according to an embodiment.

(1) First Embodiment (1-1) Construction of Liquid Crystal Display Device

Figure 1:
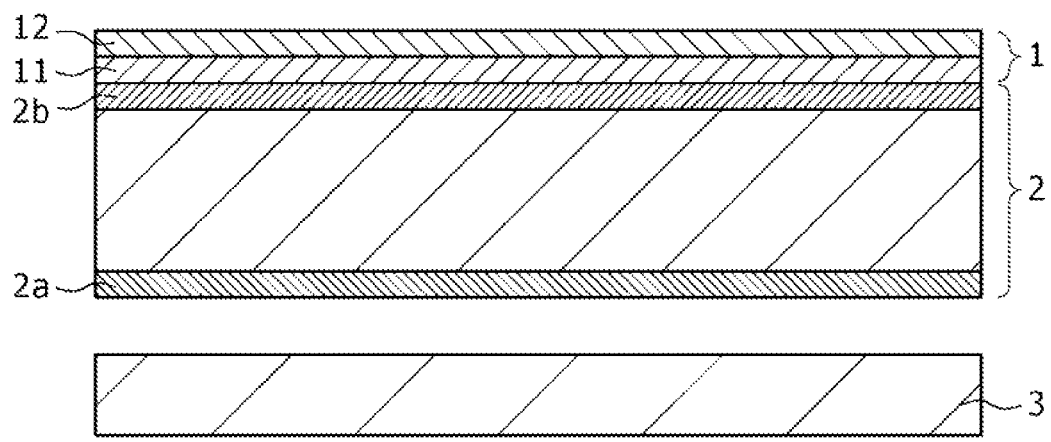
FIG. 1 is a diagrammatic cross-sectional view showing an example of the construction of a liquid crystal display device in a first embodiment.

FIG. 1 shows an example of the construction of a liquid crystal display device in a first embodiment. The liquid crystal display device includes, as shown in FIG. 1, a liquid crystal panel 2 and a light source 3 provided directly under the liquid crystal panel 2, and the liquid crystal panel 2 has an anti-glare film 1 on the display side thereof.

The light source 3 supplies light to the liquid crystal panel 2, and has, e.g., a fluorescent lamp (FL), electroluminescence (EL), or a light emitting diode (LED). The liquid crystal panel 2 spatially modulates the light supplied by the light source 3 to display information. On both surfaces of the liquid crystal panel 2 are provided polarizer sheets 2a and 2b. The polarizer sheet 2a and polarizer sheet 2b permit one of the polarized light components perpendicular to each other with respect to the incident light to pass through the sheets and shut out another by absorption. The polarizer sheet 2a and polarizer sheet 2b are arranged so that, for example, their transmission axes are perpendicular to each other.

(1-2) Construction of Anti-Glare Film

Figure 2:
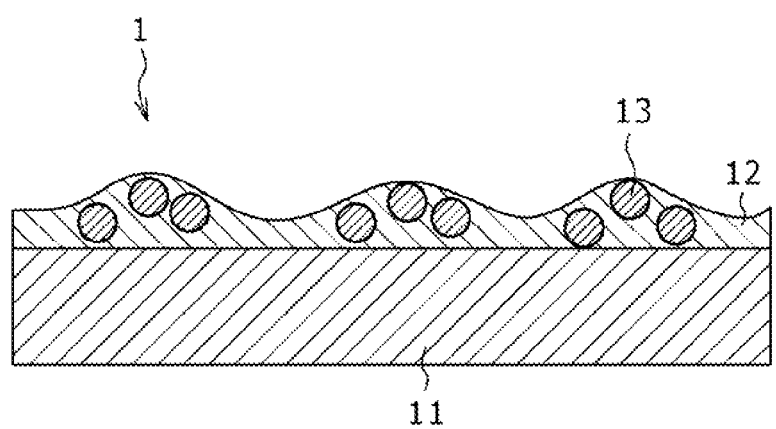
FIG. 2 is a diagrammatic cross-sectional view showing an example of the construction of an anti-glare film in a first embodiment.

FIG. 2 shows an example of the construction of an anti-glare film 1 in a first embodiment. The anti-glare film 1 includes, as shown in FIG. 2, a substrate 11 and an anti-glare layer 12 formed on the substrate 11. The anti-glare layer 12 includes fine particles 13, and Benard cells are formed in the surface of the anti-glare layer by convection caused in the coating composition during drying of the coating composition, and appropriate agglomeration of the fine particles 13 forms fine irregularities.

The anti-glare film 1 has a degree of white muddiness of 2.0 or less, as measured by quantitatively determining a diffuse reflection component of the diffused light incident upon the surface of the anti-glare layer 12 of the anti-glare film 1 having black glass bonded to the back surface thereof. This is because the degree of white muddiness of 2.0 or less can suppress a lowering of the contrast.

When nonpolar styrene fine particles composed mainly of styrene are used as the fine particles 13, it is preferred that a solvent having a surface tension of 23 mN/m or less is used. In this case, surface properties having a small degree of white muddiness while maintaining anti-glare properties can be obtained. When acryl-styrene fine particles composed mainly of an acryl-styrene copolymer including an acryl component added to styrene are used, the above desired surface properties can be obtained even using an aromatic, ketone, or ester solvent generally used having a surface tension higher than the above surface tension (23 mN/m).

The anti-glare film 1 has a degree of white muddiness of 1.7 or less, as measured by quantitatively determining a diffuse reflection component of the diffused light incident upon the surface of the anti-glare layer 12 of the anti-glare film 1 having a black acrylic sheet bonded to the back surface thereof. This is because the degree of white muddiness of 1.7 or less can suppress a lowering of the contrast.

The appearance of white muddiness is perceived by detecting reflected light diffused by the surface of the anti-glare layer. The term "degree of white muddiness" used herein means a value quantitatively determined by simulating the above phenomenon using a commercially available spectrocolorimeter, e.g., an integrating sphere type spectrocolorimeter SP64 (manufactured and sold by X-Rite, Incorporated).

Substrate

As a material for the substrate 11, for example, a transparent plastic film is used. The transparent plastic film, for example, a known polymer film can be used. Specific examples of known polymer films include triacetylcellulose (TAC), polyester (TPEE), polyethylene terephthalate (PET), polyimide (PI), polyamide (PA), aramid, polyethylene (PE), polyacrylate (PAR), polyether sulfone, polysulfone, diacetylcellulose, polypropylene (PP), polyvinyl chloride, acrylic resins (PMMA), polycarbonate (PC), epoxy resins, urea resins, urethane resins, and melamine resins, and a transparent plastic film can be appropriately selected from these known polymer films. It is preferred that the substrate 11 has a thickness of 38 to 100 μm from the viewpoint of achieving excellent productivity, but the thickness of the substrate is not particularly limited to this range.

Anti-Glare Layer

It is preferred that the anti-glare layer 12 has an average thickness in the range of from the average particle diameter of the fine particles 13 to three times the average particle diameter of the fine particles 13. Specifically, the anti-glare layer 12 preferably has an average thickness in the range of from the average particle diameter of the fine particles 13 to 30 μm, more preferably in the range of from the average particle diameter of the fine particles 13 to 15 μm. If the average thickness is less than the average particle diameter of the fine particles 13, the degree of white muddiness is likely to be increased. On the other hand, if the average thickness is more than three times the average particle diameter of the fine particles 13, the resultant film is likely to suffer curling during curing of the resin in the production of film.

The anti-glare layer 12 has fine irregularities formed in the surface thereof. The fine irregularities is different from a conventional irregularities formed from the fine particles 13 protruding from the anti-glare layer 12, and is formed by applying a coating composition containing the fine particles 13 to the substrate 11 and then drying it so that Benard cells are formed in the surface of the coating film by convection caused in the coating composition during the drying. The irregularities are preferably irregularities with a long-period moderate waviness. For example, it is preferred that a plurality of fine particles 13 appropriately collide in the in-plane direction by convection caused in the coating composition and are agglomerated mainly in the in-plane direction as they are dried, forming protruding portions on the surface of the anti-glare layer. It is preferred that the fine particles 13 do not protrude from the anti-glare layer 12 and the surfaces of the fine particles 13 are not exposed. If the surfaces of the fine particles 13 are exposed, fine irregularities containing components having sharp angles are formed due to the steep slope portions of the fine particles 13, and the resultant surface diffuses light in different directions, causing the display screen to be whitish.

Figure 3:
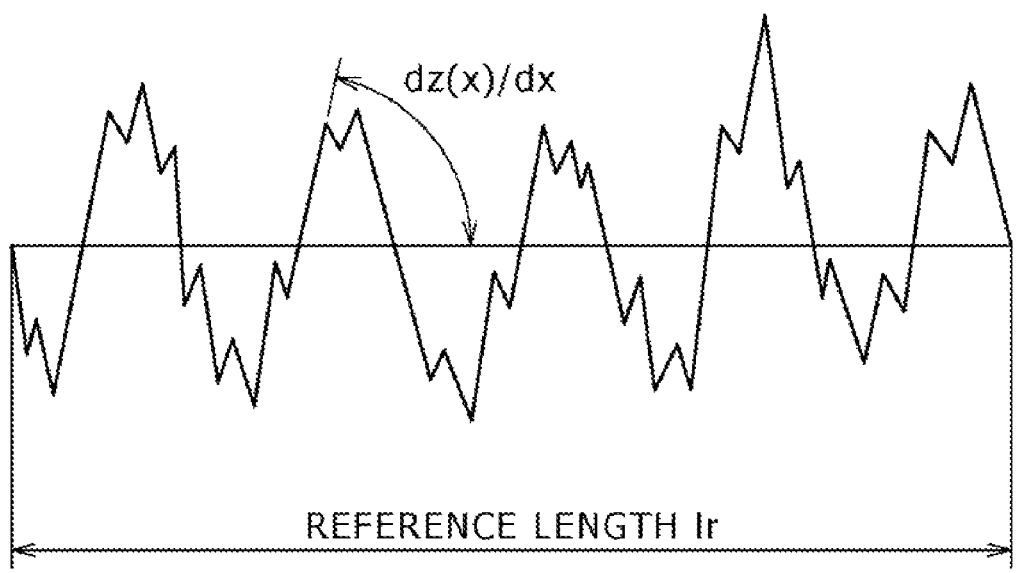
FIG. 3 is a diagram for explaining a root mean square slope.

FIG. 3 is a diagram for explaining a root mean square slope. A root mean square roughness RΔq of a roughness curve, which is a parameter indicating surface roughness, is a parameter determined by obtaining an average of slopes in a micro-range, and is represented by the following formula (1).

RΔq (or Rdq): Root mean square slope of roughness curve
Root mean square of local slope dz/dx in reference length $$R\Delta q = \sqrt{\frac{1}{lr}\int_0^{lr}\left(\frac{d}{dx}Z(x)\right)^2 dx} \tag{1}$$

It is preferred that the root mean square roughness RΔq, which is a parameter indicating the surface roughness of the anti-glare layer 12, is 0.003 to 0.05 μm. If the root mean square roughness RΔq is smaller than 0.003 μm, anti-glare properties are not obtained. On the other hand, if the root mean square roughness RΔq is larger than 0.05 μm, the appearance of white muddiness becomes strong and the contrast is lowered. The conditions for measurement of a root mean square roughness RΔq are in conformity with JIS B0601:2001. There is a correlation between the root mean square slope RΔq and the optical characteristics {contrast (appearance of white muddiness) and anti-glare properties}, and therefore, when the root mean square slope RΔq falls in the above range, both high contrast and anti-glare properties can be achieved.

The fine particles 13 are, for example, spherical or flattened fine particles such as inorganic fine particles or organic fine particles. The fine particles 13 preferably have an average particle diameter of about 5 nm to about 15 μm. If the average particle diameter is smaller than 5 nm, the anti-glare layer 12 has too fine surface roughness, so that the anti-glare properties are poor. On the other hand, if the average particle diameter is larger than 15 μm, the anti-glare layer 12 has too large a thickness and hence is likely to suffer curling during curing of the resin in the production of film. An average particle diameter of the fine particles 13 is determined by measuring a particle diameter by means of, e.g., a Coulter Multisizer and obtaining an average of the resultant data.

As organic fine particles, fine particles composed mainly of, for example, styrene (PS) or an acryl-styrene copolymer may be used. The organic fine particles may be either cross-linked or uncross-linked and there is no particular limitation, and any organic fine particles comprised of a plastic or the like may be used. When slightly polar fine particles 13 composed of, e.g., an acrylic resin are used as the fine particles 13, the convection in the coating composition and the agglomeration of the fine particles 13 are slightly unlikely to be caused during the production of film. For removing such disadvantages, the use of a solvent having a higher surface tension is required, but such a solvent has a high boiling point and the coating film is not easily dried, and hence this solvent is difficult to handle in the production of film. Therefore, it is more preferred that nonpolar fine particles 13 composed of, for example, styrene are used. Further, especially preferred are the fine particles 13 composed of an acryl-styrene copolymer since the surface energy of the copolymer may be changed by controlling the acryl-styrene ratio in the synthesis of the copolymer and a solvent may be selected from a wide variety of usable solvents.

It is preferred that the acryl-styrene copolymer comprises 60 to 90% by mass of a styrene component and 10 to 40% by mass of an acryl component. When the amount of the acryl component is less than 10% by mass, the fine particles 13 are likely to be three-dimensionally agglomerated in the drying step described below, so that the degree of white muddiness in the resultant anti-glare film 1 is increased. As a result, it is difficult to achieve both high contrast and anti-glare properties like a conventional anti-glare film. On the other hand, when the amount of the acryl component is more than 40% by mass, Benard cells are unlikely to be formed in the drying step described below, so that only poor anti-glare properties are obtained. As a result, it is difficult to achieve both high contrast and anti-glare properties like a conventional anti-glare film.

As inorganic fine particles, for example, crystalline silica or alumina may be used. It is preferred that the inorganic fine particles have a nonpolar surface changed from the polar surface by a treatment with an organic substance. The controlled nonpolarity causes appropriate convection or agglomeration of the fine particles 13 to form desired Benard cells.

It is preferred that the anti-glare layer has a packing ratio for the fine particles 13 of 4 to 10%. If the packing ratio is less than 4%, many flat portions are likely to be formed in the surface of the anti-glare layer, so that it is difficult to obtain anti-glare properties. On the other hand, if the packing ratio is more than 10%, the dependency of the anti-glare properties on the thickness is likely to be small, making it difficult to control the anti-glare properties by changing the thickness. The packing ratio means a ratio of the content B of the fine particles to the content A of the resin in the anti-glare layer (B/A×100).

The anti-glare film 1 in an first embodiment has fine irregularities with a continuously and moderate waviness in the surface of the anti-glare layer 12 by virtue of a Benard cell structure, and therefore can suppress light diffusion in different directions while maintaining the anti-glare properties, thus preventing the display screen from becoming whitish.

(1-2) Method for Producing an Anti-Glare Film

Next, an example of a method for producing the anti-glare film 1 having the above construction is described. In the method for producing the anti-glare film 1, a coating composition including fine particles 13, a resin, and a solvent is applied to a substrate 11, and convection is caused during drying of the solvent to form Benard cells in the surface of the coating film, followed by curing.

Preparation of Coating Composition

First, for example, a resin, the fine particles 13, and a solvent are mixed together by means of an agitator, such as a disper, or a dispersion mixer, such as a bead mill, to obtain a coating composition having the fine particles 13 dispersed therein. In this instance, a light stabilizer, an ultraviolet light absorber, an antistatic agent, a flame retardant, an antioxidant, or the like can be further added if desired. Silica fine particles or the like may be added as a viscosity modifier.

As a solvent, there may be used, for example, an organic solvent which dissolves the resin raw material used and has excellent wettability with the fine particles 13 and does not cause the substrate to be whitish. For forming Benard cells by the fine particles 13 arranged on the plane as described above, a solvent having a surface tension suitable for the surface energy of the fine particles 13 to be used is selected. It is preferred that the difference between the surface energy of the organic fine particles and the surface tension of the solvent is 8 to 13 mN/m. If the difference in surface tension is less than 8 mN/m, the fine particles 13 are likely to be three-dimensionally agglomerated markedly, causing the surface to glare and be whitish. On the other hand, if the difference in surface tension is more than 13 mN/m, the fine particles 13 are unlikely to be agglomerated, so that the resultant surface has poor anti-glare properties. For example, when styrene fine particles are used as the organic fine particles, it is preferred that a solvent having a surface tension of 23 mN/m or less at the application temperature is used. In this case, appropriate Benard cells are formed during the drying of the coating composition, making it possible to obtain a moderate waviness surface of the anti-glare layer 12. If the surface tension falls outside of the above range, the fine particles 13 are agglomerated markedly to form remarkably surface irregularities of the anti-glare layer 12, and therefore the resultant film has excellent anti-glare properties, but the surface disadvantageously become whitish and glares. Examples of the organic solvents include t-butanol having a surface tension of 20.0 mN/m at an environmental temperature of 20° C. and isopropyl acetate having a surface tension of 22.1 mN/m under environmental conditions at 22° C. When fine particles composed of an acryl-styrene copolymer having a surface energy larger than that of the styrene fine particles are used, an organic solvent generally used having a higher surface tension, for example, an ester solvent, such as butyl acetate (surface tension: 24.8 mN/m), a ketone solvent, such as methyl isobutyl ketone (surface tension: 25.4 mN/m), or an aromatic solvent, such as toluene (surface tension: 27.9 mN/m), can be used. The fine particles and solvent are not particularly limited to these materials as long as the above requirements are satisfied.

A surface tension of the solvent is determined by, for example, a wilhelmy method in which a wilhelmy plate and a liquid sample are brought into contact with each other to apply a strain and force for drawing the wilhelmy plate into the liquid is measured. As a measuring apparatus, for example, Rheo-Surf, manufactured and sold by UBM Corporation, which is a dynamic surface tension measuring machine, may be used.

As a resin, from the viewpoint of facilitating the production, an ionizing radiation-curable resin which is curable by irradiation with, e.g., ultraviolet light or an electron beam, or a thermosetting resin which is curable by heat is preferred, and the most preferred is a photosensitive resin which is curable by irradiation with ultraviolet light. As the photosensitive resin, an acrylate resin, such as urethane acrylate, epoxy acrylate, polyester acrylate, polyol acrylate, polyether acrylate, or melamine acrylate, may be used. With respect to the properties of the cured resin, especially preferred is a resin which may produce a cured resin having excellent permeability to light from the viewpoint of achieving image permeability or a resin which can produce a cured resin having high hardness from the viewpoint of obtaining a flaw resistance, and a resin may be appropriately selected. The ionizing radiation-curable resin is not limited to an ultraviolet curing resin, and any ionizing radiation-curable resin may be used as long as it has permeability to light, but preferred is an ionizing radiation-curable resin which does not markedly change in hue of the transmitted light or transmitted light amount due to coloration or haze. The ionizing radiation-curable resin and thermosetting resin may be used individually or in combination.

The photosensitive resin is obtained by incorporating a photopolymerization initiator into an organic material which is capable of forming a resin, such as monomers, oligomers, or a polymer. For example, an urethane acrylate resin is obtained by reacting isocyanate monomers or a prepolymer with polyester polyol and reacting acrylate or methacrylate monomers having a hydroxyl group with the resultant product.

In a first embodiment, as the monomer, oligomer, or polymer which is capable of forming a resin, it is preferred to use at least one of a monomer, an oligomer, and a polymer, which remains in the liquid state after drying the coating composition. As the monomer, oligomer, or polymer, which remains in the liquid state after drying the coating composition, preferred is one having a relatively high viscosity such that it maintains a Benard cell structure in the surface of the coating composition dried and form meniscuses of the liquid resin within the Benard cells. When using such a monomer, oligomer, or polymer, the surface keeps fine irregularities with a moderate waviness after drying the coating composition applied.

As the photopolymerization initiator contained in the photosensitive resin, for example, a benzophenone derivative, an acetophenone derivative, an anthraquinone derivative, and the like may be used individually or in combination. In the photosensitive resin, a component for facilitating the film formation, such as an acrylic resin, may be appropriately selected and incorporated.

Coating (Application of Coating Composition)

The coating composition obtained by the above processes is then subjected to filtration by means of a filter having a pore size about two times the average particle diameter of the fine particles, and applied to a substrate 11. The coating composition is applied so that the average coating thickness after dried preferably becomes 3 to 30 µm, more preferably 4 to 15 µm. If the thickness is smaller than the lower limit of the above range, it is difficult to obtain a desired hardness. On the other hand, if the thickness is larger than the upper limit of the above range, the resultant film is likely to suffer marked curling during the curing of the resin. With respect to the method for applying the coating composition, there is no particular limitation, and a known coating method is used. Examples of known coating methods include methods using a gravure coater, a bar coater, a die coater, a knife coater, a comma coater, a spray coater, or a curtain coater. The coating method is not limited to these, and there can be used any method which uniformly applies the coating composition in a predetermined thickness.

Drying and Forming Benard Cells

The coating composition applied is dried so that the solvent is volatilized. In a first embodiment, utilizing Marangoni convection by the non-uniform distribution of surface tension caused during volatilization of the solvent, appropriate collision and agglomeration of the fine particles 13 are caused by the convection in the coating composition to form a Benard cell structure in the surface of the coating layer. Meniscuses of a liquid resin formed in the Benard cells allow fine irregularities with a moderate waviness, to be formed in the surface of the coating layer.

In drying the coating composition, it is preferred that the fine particles 13 are agglomerated mainly in the in-plane direction of the anti-glare layer 12 to form two-dimensional agglomerations and the agglomerations are present in the surface of the anti-glare layer without gathering. In this case, fine irregularities with a continuously and moderate waviness is formed in the surface of the anti-glare layer, achieving both anti-glare properties and high contrast. The phrase "the fine particles 13 are agglomerated mainly in the in-plane direction of the anti-glare layer 12" used herein means: (1) that all the fine particles 13 are agglomerated only in the in-plane direction of the anti-glare layer 12 without being stacked on one another in the thicknesswise direction; or (2) that almost all the fine particles 13 are agglomerated in the in-plane direction and the remaining fine particles 13 are stacked on one another in the thicknesswise direction so that the degree of white muddiness is not increased (to more than 1.7 as measured for the anti-glare film 1 having a black acrylic sheet attached to the back surface). All the fine particles 13 ideally form two-dimensional agglomerations, but part of the fine particles 13 may be separate from one another without forming agglomerations so that the degree of white muddiness is not increased.

It is preferred that the agglomerations of the fine particles 13 are covered with the coating composition in the surface of the anti-glare layer 12. When the agglomerations are covered, the fine particles 13 protrudes from the anti-glare layer 12 and large angle components due to the curvature of the fine particles per se are formed in the surface, so that the increasing of the degree of white muddiness can be prevented. The phrase "the aggregates are covered with the coating composition" used herein means: (1) that the agglomerations are completely covered with the coating composition; or (2) that part of the fine particles 13, which form the agglomerations, are not covered with the coating composition but exposed so that the degree of white muddiness is not increased (to more than 1.7 as measured for the anti-glare film 1 having a black acrylic sheet bonded to the back surface).

It is considered that the formation of a Benard cell structure is affected by the relationship between the surface energy of the fine particles 13 and the surface tension of the solvent. For controlling the Benard cell structure, it is preferred that the surface tension of the solvent is selected depending on the surface energy of the fine particles 13. For example, when styrene fine particles 13 having a nonpolar surface are added in an appropriate amount, it is preferred that a solvent having a surface tension of 23 mN/m or less is selected. If the surface tension of the solvent is more than 23 mN/m, the fine particles 13 are agglomerated markedly to form remarkably surface irregularities of the anti-glare layer 12, so that the surface becomes whitish and glares. In the case of using the styrene fine particles 13, usable solvents are limited, and a ketone solvent or an aromatic solvent such as toluene would not be allowed to use accordingly. Thus, the use of acryl-styrene copolymer fine particles including an acryl component added to styrene and having increased surface energy makes it possible to use a solvent such as toluene. Specifically, when acryl-styrene copolymer fine particles composed mainly of an acryl-styrene copolymer comprising 60 to 90% by mass of a styrene component and 10 to 40% by mass of an acryl component are used, it is preferred that a solvent having a surface tension of 27.9 mN/m or less is selected. Examples of solvents having such a surface tension include t-butanol, isopropyl acetate, toluene, methyl ethyl ketone (MEK), isopropyl alcohol (IPA), methyl isobutyl ketone (MIBK), butyl acetate, and dimethyl acetate. These solvents may be used individually or in combination.

For maintaining the Benard cell structure and meniscuses formed in the Benard cells after the drying, it is preferred to use a resin which remains in the liquid state after the drying step and before being cured. This is because such a resin for the coating layer keeps the moderate surface waviness even after dried. It is presumed that, if the coating composition contains a dry curing resin which is changed to be in the solid state after being dried, the surface of the anti-glare layer 12 formed on the flat substrate 11 is flat in the initial stage of the drying and remains flat according to the substrate 11 after the inside of the layer is completely dried in the drying step.

With respect to the conditions for drying, there is no particular limitation, and there may be employed either air drying or artificial drying in which the drying temperature or drying time is controlled. It should be noted that if a stream of air is sent to the surface of the coating composition during the drying, care is required to avoid forming wind-wrought pattern in the surface of the coating layer. If a wind-wrought patter is formed, irregularities with a desired moderate waviness are not formed in the surface of the anti-glare layer 12, thus making it difficult to achieve both the anti-glare properties and high contrast. The drying temperature and drying time may be appropriately determined depending on the boiling point of the solvent contained in the coating composition. In this case, it is preferred to select the drying temperature and drying time so that the substrate does not suffer deformation due to heat shrinkage while considering the heat resistance of the substrate 11.

Curing

After drying, the ionizing radiation-curable resin is cured to form an anti-glare layer 12. Examples of curing energy sources include an electron beam, ultraviolet light, visible light, and a gamma ray, but, from the viewpoint of the productive facilities, ultraviolet light is preferable. With respect to the ultraviolet light source, there is no particular limitation, and a high-pressure mercury lamp, a metal halide lamp, or the like is appropriately selected. With respect to the irradiation dose, there may be appropriately selected an irradiation dose such that the resin used is cured and the resin and the substrate 11 do not suffer yellowing. The atmosphere for irradiation may be appropriately selected depending on the curing of the resin, and the irradiation can be performed in air or in an inert atmosphere of nitrogen gas, argon gas, or the like. When a thermosetting resin is used as the resin, the thermosetting resin is heated to form an anti-glare layer 12.

In the curing step, the resin having Benard cells formed therein is changed to be in the solid state, and then an anti-glare layer 12 having fine irregularities with a moderate waviness in the surface thereof is formed.

Thus, a desired anti-glare film 1 is obtained.

In a first embodiment, Benard cells are formed due to the convection and agglomeration of the fine particles 13 caused during volatilization of the solvent contained in the coating composition, so that the anti-glare layer 12 has fine irregularities with a moderate waviness in the surface thereof, thus achieving an anti-glare film 1 having both high contrast and excellent anti-glare properties. By using the anti-glare film 1 in a liquid crystal display device, the image displayed on the liquid crystal display device can be improved in visibility.

(2) Second Embodiment (2-1) Construction of Anti-Glare Film

Figure 4:
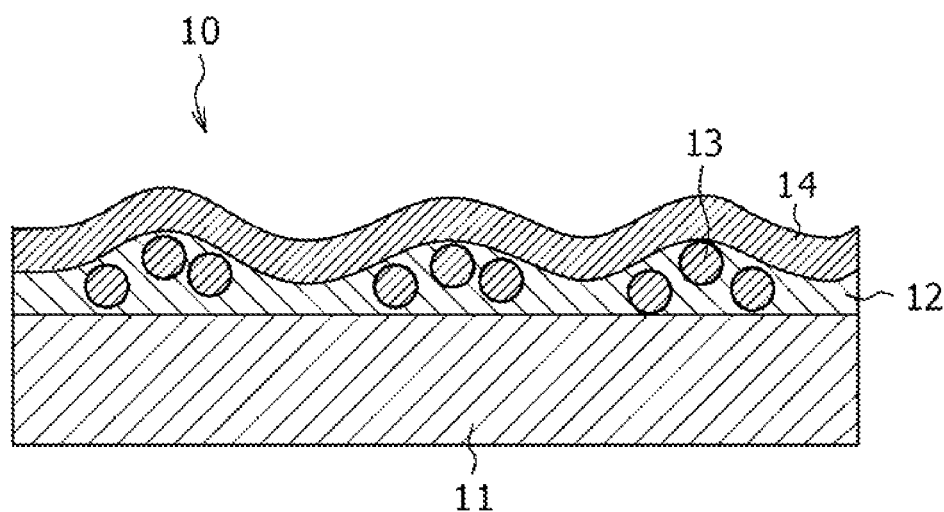
FIG. 4 is a diagrammatic cross-sectional view showing an example of the construction of an anti-glare film in a second embodiment.

FIG. 4 shows an example of the construction of an anti-glare film 10 in a second embodiment. The anti-glare film 10 includes an anti-glare layer 12 having fine particles 13 formed on a substrate 11, and a transparent resin layer 14 including a dry curing transparent resin formed on the anti-glare layer 12. The substrate 11, anti-glare layer 12, and fine particles 13 are similar to those in the first embodiment, and fine irregularities are formed in the surface of the anti-glare layer 12 by convection and agglomeration of the fine particles 13.

The transparent resin layer 14 has fine irregularities formed in the surface thereof. By virtue of the transparent resin layer 14 containing a drying and curing resin, while maintaining the irregularities in the surface of the underlying anti-glare layer 12, only the slope near the fine particles in the anti-glare layer 12 is reduced, and therefore the resultant anti-glare film is the same or more reduced degree of white muddiness than the anti-glare film 1 in the first embodiment, thus achieving excellent contrast.

(2-2) Method for Producing an Anti-Glare Film

Next, an example of a method for producing the anti-glare film 10 according to a second embodiment is described. In the method for producing the anti-glare film 10, a coating composition including a resin and a solvent is applied to the anti-glare layer 12 of the anti-glare film 1 in the first embodiment, and dried and cured to form a transparent resin layer 14. A method for forming the transparent resin layer 14 is described below in detail.

Preparation of Coating Composition

First, for example, a resin and a solvent are mixed together to obtain a coating composition. In this instance, a light stabilizer, an ultraviolet light absorber, an antistatic agent, a flame retardant, an antioxidant, or the like may be further added if desired.

With respect to the solvent, there is no particular limitation as long as it dissolves the resin raw material used and does not dissolve the underlying anti-glare layer 12. As the solvent, an organic solvent, such as t-butanol, toluene, methyl ethyl ketone (MEK), isopropyl alcohol (IPA), or methyl isobutyl ketone (MIBK), may be used.

As the resin, for example, at least a resin which is changed to be in the solid state by drying is preferably used. The resin which is changed to be in the solid state by drying means a resin curable by drying (hereinafter, the resin which is changed to be in the solid state by drying is frequently referred to as "dry curing resin"), and preferred is the resin comprising at least one of a monomer, an oligomer, and a polymer, each having, e.g., a molecular weight of 30,000 or more. When the coating composition contains a dry curing resin, the coating composition applied to the surface of the anti-glare layer is unlikely to flow into depressed portions in the surface of the anti-glare layer during drying of the coating composition, and whereby the depressed portions are prevented from being filled with the coating composition, making it possible to avoid flattening the surface. Examples of the dry curing resins include urethane resins, acrylic resins, styrene resins, melamine resins, and cellulose resins. A monomer, oligomer, or polymer, which is capable of forming an ionizing radiation-curable resin or a thermosetting resin, can be used, but the dry curing resin is not limited to these. As an ionizing radiation-curable resin, one having a reactive group, such as an acryl double bond, is preferably used. As a thermosetting resin, one having a thermosetting group, such as a hydroxyl group, is preferably used. When using such a resin, the reactivity is improved in the ionizing radiation-curable treatment or thermosetting treatment.

As the resin material, a mixture of at least one of the ionizing radiation-curable or thermosetting monomer, oligomer, and polymer used in the first embodiment added to the above-mentioned dry curing resin may be used. Preferably, one which undergoes a curing reaction with the material used as a dry curing resin is used.

Coating (Application of Coating Composition)

The coating composition obtained by the above processes is then applied to the anti-glare layer 12. The coating composition is applied so that the dried average coating thickness becomes preferably ½ to 2 times the particle diameter of the fine particles 13 in the anti-glare layer, and it is preferred that the coating composition covers protruding portions in the surface of the anti-glare layer 12. With respect to the method for applying the coating composition, there is no particular limitation, and a known coating method similar to that in the first embodiment is used. By applying the coating composition to the anti-glare layer 12 in a predetermined thickness uniformly, a moderate waviness, fine irregularities equivalent to the fine irregularities formed in the surface of the anti-glare layer 12 is formed in the surface of the coating layer.

Drying and Curing

The coating composition applied is dried and cured to obtain a transparent resin layer 14 having fine irregularities with a moderate waviness in the surface thereof. For forming fine irregularities with a moderate waviness in the surface of the transparent resin layer 14, it is preferred that the coating composition contains at least a dry curing resin as described above. When the coating composition containing no dry curing resin material, i.e., the coating composition including only a resin material, such as a monomer, an oligomer, or a polymer, which remains in the liquid state after being dried, is applied to the anti-glare layer 12, the resin material undergoes leveling after the application and before completion of the drying and curing to fill depressed portions in the surface of the anti-glare layer 12, flattening the surface, so that the resultant film has poor anti-glare properties. Further, the protruding portions in the surface of the anti-glare layer 12 remain as protrusions to cause the surface to be markedly rough. It is presumed that, when the coating composition contains a dry curing resin, the dried surface formed in the initial stage of drying of the coating composition covers the moderate surface waviness of the anti-glare layer 12 to prevent leveling, forming further moderate waviness components.

When an ionizing radiation-curable resin is contained as a resin, the resin is cured by ionizing radiation to form a transparent resin layer. When a thermosetting resin is contained, the resin is cured by heating to form a transparent resin layer 14.

Thus, a desired anti-glare film is obtained.

In a second embodiment, fine irregularities with a moderate waviness equivalent to or more fine irregularities with a moderate waviness formed in the surface of the anti-glare layer 12 is formed in the surface of the transparent resin layer 14. Accordingly, by using the anti-glare film 10 in a display device, such as a liquid crystal display, a plasma display, an electroluminescence display, or a cathode ray tube (CRT) display, more excellent contrast than that obtained in the first embodiment can be achieved while maintaining excellent anti-glare properties, and thus the visibility can be further improved.

EXAMPLES

Hereinbelow, embodiments of the present application will be described in more detail with reference to the following Examples, which should not be construed as limiting the scope of the present application.

Example 1

100 meters of a continuous anti-glare film was prepared by continuous coating using a gravure coater as follows.

First, 200 grams of styrene fine particles having a particle diameter of 5 to 7 μm and an average particle diameter of 6 μm, 4,000 grams of an ultraviolet curing, liquid tetrafunctional urethane acryl oligomer as a resin material, and 200 grams of IRGACURE 184 (manufactured and sold by CIBA-GEIGY) as a photoreaction initiator were added to 6,000 grams of t-butanol having a surface tension of 20.0 mN/m at an application temperature of 20° C. as a solvent and stirred to prepare a coating composition, and then the prepared coating composition is filtered using a 10-μm mesh filter.

Then, the coating composition filtered was applied to a triacetylcellulose (TAC) film having a thickness of 80 μm by means of a gravure coater at an application speed of 20 m/minute. The resultant film was dried in a drying oven having a length of 30 meters at a drying temperature of 80° C. In this instance, utilizing Marangoni convection due to the non-uniform distribution of surface tension caused during volatilization of the solvent, appropriate collision and agglomeration of the fine particles were caused by the convection in the coating composition to form a Benard cell structure in the surface of the coating layer. Meniscuses of a liquid resin formed in the Benard cells allowed fine irregularities with a moderate surface waiviness to be formed in the surface of the coating layer. Subsequently, the film was continuously fed into an ultraviolet curing oven and irradiated with ultraviolet light under conditions at 160 watts and at an irradiation dose of 300 mJ/cm$^2$ to form an anti-glare layer having a dried average coating thickness of 6 μm, thereby obtaining a wound anti-glare film.

Example 2

An anti-glare film was obtained in substantially the same manner as in Example 1 except that the dried coating thickness was 8 μm.

Example 3

An anti-glare film was obtained in substantially the same manner as in Example 1 except that the dried coating thickness was 12 μm.

Example 4

An anti-glare film was obtained in substantially the same manner as in Example 1 except that the dried coating thickness was 15 μm.

Example 5

An anti-glare film was obtained in substantially the same manner as in Example 1 except that the dried coating thickness was 18 μm.

Example 6

An anti-glare film was obtained in substantially the same manner as in Example 1 except that isopropyl acetate having a surface tension of 22.1 mN/m at an application temperature of 22° C. was used as a solvent.

Example 7

1,000 g of a dry curing acrylic polymer having a molecular weight of 50,000 as a resin material was dissolved in 5,000 g of methyl isobutyl ketone (MIBK) having a surface tension of 25.4 mN/m at an application temperature of 25° C. as a solvent to prepare a coating composition, and then the coating composition was applied to the anti-glare layer of the anti-glare film in Example 1 by means of a gravure coater, and dried in a drying oven at 80° C. so that the resin was cured to form a transparent resin layer having a dried average coating thickness of 6 μm, thus obtaining an anti-glare film.

Example 8

An anti-glare film was obtained in substantially the same manner as in Example 1 except that the fine particles were changed to fine particles comprised of an acryl-styrene copolymer (acryl: 10% by mass; styrene: 90% by mass), and that the solvent was changed to toluene.

Example 9

An anti-glare film was obtained in substantially the same manner as in Example 1 except that the fine particles were changed to fine particles composed of an acryl-styrene copolymer (acryl: 30% by mass; styrene: 70% by mass), and that the solvent was changed to methyl ethyl ketone (MEK).

Example 10

An anti-glare film was obtained in substantially the same manner as in Example 1 except that the fine particles were changed to fine particles composed of an acryl-styrene copolymer (acryl: 30% by mass; styrene: 70% by mass), and that the solvent was changed to butyl acetate.

Example 11

An anti-glare film was obtained in substantially the same manner as in Example 1 except that the fine particles were changed to fine particles composed of an acryl-styrene copolymer (acryl: 30% by mass; styrene: 70% by mass), and that the solvent was changed to MIBK.

Example 12

An anti-glare film was obtained in substantially the same manner as in Example 1 except that the fine particles were changed to fine particles composed of an acryl-styrene copolymer (acryl: 30% by mass; styrene: 70% by mass), and that the solvent was changed to toluene having a surface tension of 27.9 mN/m.

Example 13

An anti-glare film was obtained in substantially the same manner as in Example 1 except that the fine particles were changed to fine particles composed of an acryl-styrene copolymer (acryl: 30% by mass; styrene: 70% by mass), and that the solvent was changed to dimethyl carbonate.

Example 14

An anti-glare film was obtained in substantially the same manner as in Example 1 except that the fine particles were changed to fine particles composed of an acryl-styrene copolymer (acryl: 30% by mass; styrene: 70% by mass), and that the solvent was changed to a mixed solvent including 40 weight parts of toluene and 60 weight parts of dimethyl carbonate.

Example 15

An anti-glare film was obtained in substantially the same manner as in Example 1 except that the fine particles were changed to fine particles composed of an acryl-styrene copolymer (acryl: 30% by mass; styrene: 70% by mass), and that the solvent was changed to a mixed solvent including 60 weight parts of toluene and 40 weight parts of dimethyl carbonate.

Example 16

An anti-glare film was obtained in substantially the same manner as in Example 1 except that the fine particles were changed to fine particles composed of an acryl-styrene copolymer (acryl: 30% by mass; styrene: 70% by mass), and that the solvent was changed to a mixed solvent including 80 weight parts of toluene and 20 weight parts of MEK.

Example 17

An anti-glare film was obtained in substantially the same manner as in Example 1 except that the fine particles were changed to fine particles composed of an acryl-styrene copolymer (acryl: 30% by mass; styrene: 70% by mass), and that the solvent was changed to a mixed solvent including 60 weight parts of butyl acetate and 40 weight parts of dimethyl carbonate.

Example 18

An anti-glare film was obtained in substantially the same manner as in Example 1 except that the fine particles were changed to fine particles composed of an acryl-styrene copolymer (acryl: 30% by mass; styrene: 70% by mass), and that the solvent was changed to a mixed solvent including 60 weight parts of MIBK and 40 weight parts of dimethyl carbonate.

Example 19

An anti-glare film was obtained in substantially the same manner as in Example 1 except that the fine particles were changed to fine particles composed of an acryl-styrene copolymer (acryl: 40% by mass; styrene: 60% by mass), and that the solvent was changed to MIBK.

Example 20

An anti-glare film was obtained in substantially the same manner as in Example 1 except that the fine particles were changed to fine particles composed of an acryl-styrene copolymer (acryl: 40% by mass; styrene: 60% by mass), and that the solvent was changed to toluene having a surface tension of 27.9 mN/m.

Example 21

An anti-glare film was obtained in substantially the same manner as in Example 1 except that the amount of the styrene fine particles was changed to 160 grams.

Example 22

An anti-glare film was obtained in substantially the same manner as in Example 1 except that the amount of the styrene fine particles was changed to 400 grams.

Example 23

An anti-glare film was obtained in substantially the same manner as in Example 1 except that the amount of the styrene fine particles was changed to 600 grams.

Example 24

An anti-glare film was obtained in substantially the same manner as in Example 1 except that styrene fine particles having an average particle diameter of 4 µm were used, and that the average coating thickness after dried was 4 µm.

Example 25

An anti-glare film was obtained in substantially the same manner as in Example 1 except that styrene fine particles having an average particle diameter of 8 μm were used, and that the average coating thickness after dried was 8 μm.

Example 26

An anti-glare film was obtained in substantially the same manner as in Example 1 except that styrene fine particles having an average particle diameter of 10 μm were used, and that the average coating thickness after dried was 10 μm.

Comparative Example 1

An anti-glare film was obtained in substantially the same manner as in Example 1 except that the dried coating thickness was 4 μm.

Comparative Example 2

An anti-glare film was obtained in substantially the same manner as in Example 1 except that the amount of the styrene fine particles was changed to 120 grams.

Comparative Example 3

An anti-glare film was obtained in substantially the same manner as in Example 1 except that the coating thickness after dried was 5 μm.

Comparative Example 4

An anti-glare film was obtained in substantially the same manner as in Example 1 except that MIBK was used as a solvent.

Comparative Example 5

An anti-glare film was obtained in substantially the same manner as in Example 1 except that toluene was used as a solvent.

Comparative Example 6

An anti-glare film was obtained in substantially the same manner as in Example 1 except that acrylic fine particles having an average particle diameter of 6 μm were used as fine particles.

Comparative Example 7

An anti-glare film was obtained in substantially the same manner as in Example 1 except that the fine particles were changed to fine particles composed of acryl, and that the solvent was changed to MIBK.

Comparative Example 8

An anti-glare film was obtained in substantially the same manner as in Example 6 except that the fine particles were changed to fine particles composed of an acryl-styrene copolymer (acryl: 75% by mass; styrene: 25% by mass).

Comparative Example 9

An anti-glare film was obtained in substantially the same manner as in Example 6 except that the fine particles were changed to fine particles composed of an acryl-styrene copolymer (acryl: 55% by mass; styrene: 45% by mass).

Comparative Example 10

An anti-glare film was obtained in substantially the same manner as in Comparative Example 5 except that the thickness was changed to 4 μm.

Comparative Example 11

An anti-glare film was obtained in substantially the same manner as in Comparative Example 5 except that the amount of the fine particles was changed to 800 grams, and that the thickness was changed to 4 μm.

Comparative Example 12

An anti-glare film was obtained in substantially the same manner as in Example 1 except that a dry curing acrylic polymer having a molecular weight of 50,000 was used as a resin material and dried at 80° C.

Comparative Example 13

1,000 g of a liquid tetrafunctional urethane acryl oligomer as a resin material was dissolved in 5,000 grams of methyl isobutyl ketone (MIBK) as a solvent to prepare a coating composition, and then the coating composition was applied to the anti-glare layer of the anti-glare film in Example 1 by means of a gravure coater, and dried in a drying oven at 80° C. so that the solvent was volatilized, and then irradiated with ultraviolet light in an ultraviolet curing oven under conditions at 160 watts and at an irradiation dose of 300 mJ/cm$^2$ to form a transparent resin layer after dried having an average coating thickness of 6 μm, thus obtaining an anti-glare film.

Evaluation of Roughness

With respect to each of the anti-glare films obtained as described above in Examples 1 to 26 and Comparative Examples 1 to 13, surface roughness was measured and a roughness curve was obtained from the resultant two-dimensional cross-sectional curve, and a root mean square roughness RΔq of the roughness curve was determined as a roughness parameter by making a calculation. The results are shown in Table 1. The conditions for measurement were in conformity with JIS B0601:2001. The measuring apparatus and the conditions for measurement are shown below.

Measuring apparatus: Automatic Microfigure Measuring Instrument SURFCORDER ET4000A (manufactured and sold by Kosaka Laboratory Ltd.)

λc=0.8 mm; evaluation length: 4 mm; cut off: ×5

Anti-Glare Properties

With respect to each of the anti-glare films in Examples 1 to 26 and Comparative Examples 1 to 13, evaluation of anti-glare properties was conducted. Specifically, a fluorescent lighting having unshaded fluorescent lamps was reflected off the anti-glare film, and a reflection was evaluated in accordance with the following criteria. The results are shown in Table 1.

⊚: Contours of the fluorescent lamps cannot be seen. (Two fluorescent lamps are seen as single lamp.)

○: The fluorescent lamps can be seen to some extent, but the contours are not distinct.

x: The fluorescent lamps are reflected as they are.

Degree of White Muddiness

With respect to each of the anti-glare films in Examples 1 to 26 and Comparative Examples 1 to 13, the degree of white muddiness was measured. A specific method for measuring the degree of white muddiness is shown below. First, for removing the effect of reflection off the back surface to evaluate diffuse reflection of the anti-glare film per se, the back surface of the anti-glare film was bonded to black glass through an adhesive. Then, using an integrating sphere type spectrocolorimeter SP64 (manufactured and sold by X-Rite, Incorporated), measurement was conducted by a d/8° optical system in which the surface of the sample was irradiated with diffused light and the reflected light was measured by a detector positioned in the direction at 8° with the normal to the sample. With respect to the measured value, an SPEX mode in which only the diffuse reflection component was detected, excluding the specular reflection component, was employed, and the measurement was conducted at a detection view angle of 2°. Experiments have confirmed that there is a correlation between a degree of white muddiness measured by the above method and a degree of white muddiness visually perceived. The results are shown in Table 1.

With respect to each of the anti-glare films in Examples 1 to 26 and Comparative Examples 1 to 13, a degree of white muddiness of the anti-glare film having a black acrylic sheet (ACRYLITE L 502, manufactured and sold by Mitsubishi Rayon Co., Ltd.) bonded to the back surface through an adhesive was determined by making a calculation by the formula (2) below. The results are shown in Table 1. A degree of white muddiness measured for the black acrylic sheet having no anti-glare film attached was 0.2.

$$y = 1.1039x - 0.4735 \quad (2)$$

As mentioned above, there is a correlation between a degree of white muddiness measured by the above method and the degree of white muddiness visually perceived, and the correlation has confirmed that, when the above-determined value (Y value) is more than 1.7%, degree of white muddiness is perceived, when the value is 1.7% or smaller, the degree of white muddiness is reduced, and, when the value is 0.8% or less, almost no degree of white muddiness is perceived. The introduction of the formula (2) above is described later.

Agglomeration in In-Plane Direction

Figure 5:
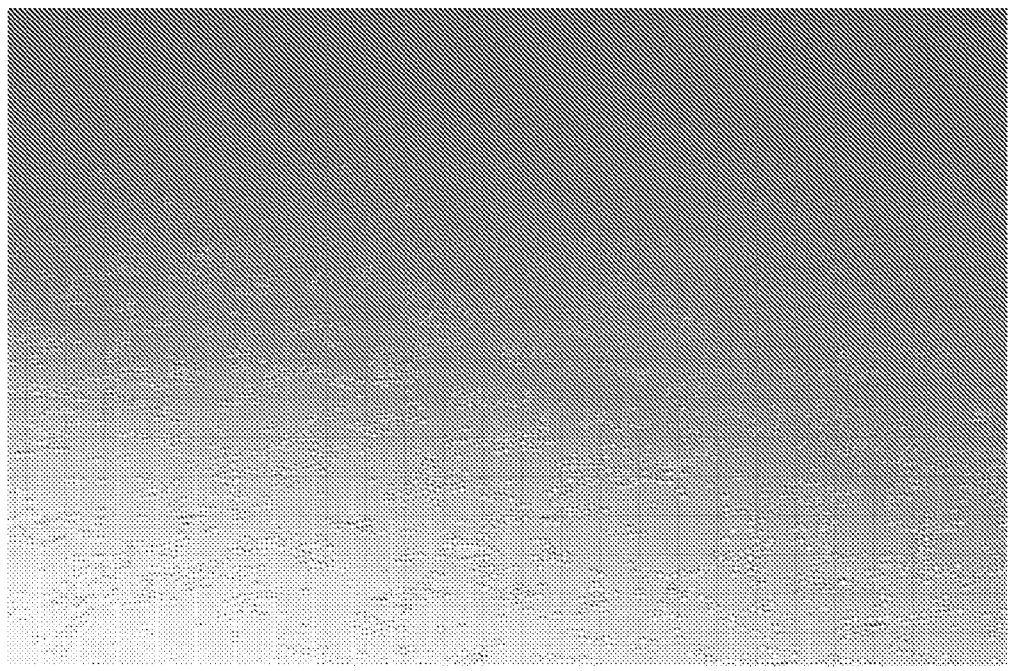
FIG. 5 is a photograph of the surface of the anti-glare film in Example 1.
Figure 6:
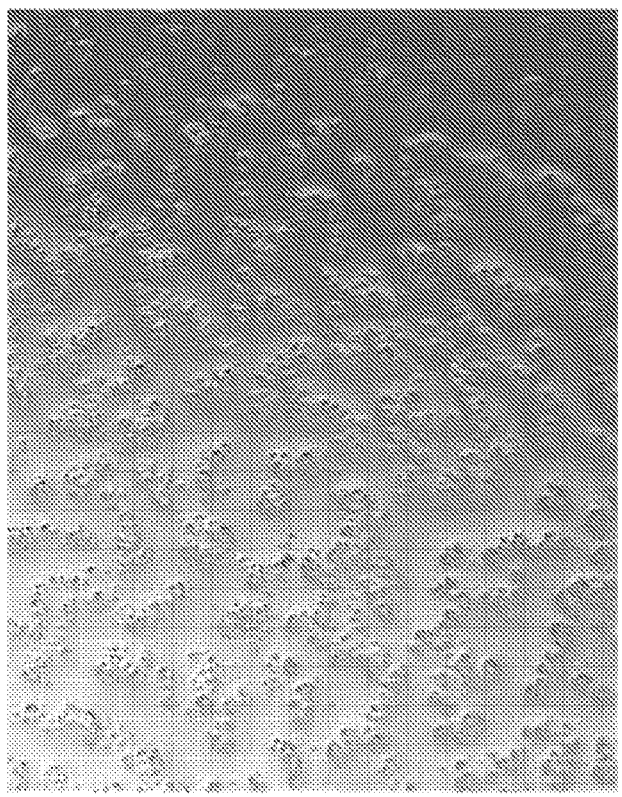
FIG. 6 is a photograph of the surface of the anti-glare film in Comparative Example 5.

The state of agglomeration of the organic fine particles was examined under an optical microscope. A sample in which the organic fine particles are agglomerated in the in-plane direction was rated "○", and a sample in which the organic fine particles are not agglomerated or are three-dimensionally agglomerated was rated "x". Among the anti-glare films in Examples 1 to 26 and Comparative Examples 1 to 13, representatively, with respect to the anti-glare films in Example 1 and Comparative Example 5, surface photographs are shown in FIGS. 5 and 6.

Formation of Meniscuses

The surface shape was examined under an optical microscope in a differential interference mode to check whether the portions between cells were flat or sloping. Alternatively, the surface was examined through a co-focal image obtained by means of a laser microscope (manufactured and sold by Lasertec Corporation) to check whether the portions between cells were flat or sloping.

TABLE 1

| | Anti-glare layer | | | | | | | |
|---|---|---|---|---|---|---|---|---|
| | Fine particles | | | Solvent | | Difference between surface energy and surface tension | Resin Dry curing | Particle packing ratio (%) |
| | Type/Content | Surface energy (mN/m) | Average particle diameter (μm) | Type | Surface tension (mN/m) | | | |
| Ex. 1 | Styrene 100 mass % | 33 | 6 | t-Butanol | 20.0 | 13.0 | X | 5 |
| Ex. 2 | Styrene 100 mass % | 33 | 6 | t-Butanol | 20.0 | 13.0 | X | 5 |
| Ex. 3 | Styrene 100 mass % | 33 | 6 | t-Butanol | 20.0 | 13.0 | X | 5 |
| Ex. 4 | Styrene 100 mass % | 33 | 6 | t-Butanol | 20.0 | 13.0 | X | 5 |
| Ex. 5 | Styrene 100 mass % | 33 | 6 | t-Butanol | 20.0 | 13.0 | X | 5 |
| Ex. 6 | Styrene 100 mass % | 33 | 6 | Isopropyl acetate | 22.1 | 10.9 | X | 5 |
| Ex. 7 | Styrere 100 mass % | 33 | 6 | t-Butanol | 20.0 | 13.0 | X | 5 |
| Ex. 8 | Styrene 90 mass %, Acryl 10 mass % | — | 6 | Toluene | 27.9 | — | X | 5 |
| Ex. 9 | Styrene 70 mass %, Acryl 30 mass % | — | 6 | MEK | 24.6 | — | X | 5 |
| Ex. 10 | Styrene 70 mass %, Acryl 30 mass % | — | 6 | Butyl acetate | 24.8 | — | X | 5 |
| Ex. 11 | Styrene 70 mass %, Acryl 30 mass % | — | 6 | MIBK | 25.4 | — | X | 5 |
| Ex. 12 | Styrene 70 mass %, Acryl 30 mass % | — | 6 | Toluene | 27.9 | — | X | 5 |
| Ex. 13 | Styrene 70 mass %, Acryl 30 mass % | — | 6 | Dimethyl carbonate | — | — | X | 5 |
| Ex. 14 | Styrene 70 mass %, Acryl 30 mass % | — | 6 | Tolene 40 w/t parts/ Dimethyl carbonate 60 w/t parts | — | — | X | 5 |
| Ex. 15 | Styrene 70 mass %, Acryl 30 mass % | — | 6 | Tolene 60 w/t parts/ Dimethyl carbonate 40 w/t parts | — | — | X | 5 |
| Ex. 16 | Styrene 70 mass %, Acryl 30 mass % | — | 6 | Toluene 80 w/t parts/ MEK 20 w/t parts | — | — | X | 5 |

TABLE 1-continued

| | Composition | | | Solvent | | | | |
|---|---|---|---|---|---|---|---|---|
| Ex. 17 | Styrene 70 mass %, Acryl 30 mass % | — | 6 | Butyl acetate 60 w/t parts/ Dimethyl carbonate 40 w/t parts | — | — | X | 5 |
| Ex. 18 | Styrene 70 mass %, Acryl 30 mass % | — | 6 | MIBK 60 w/t parts/ Dimethyl carbonate 40 w/t parts | — | — | X | 5 |
| Ex. 19 | Styrene 60 mass %, Acryl 40 mass % | — | 6 | MIBK | 25.4 | — | X | 5 |
| Ex. 20 | Styrene 60 mass %, Acryl 40 mass % | — | 6 | Toluene | 27.9 | — | X | 5 |
| Ex. 21 | Styrene 100 mass % | 33 | 6 | t-Butanol | 20.0 | 13.0 | X | 4 |
| Ex. 22 | Styrene 100 mass % | 33 | 6 | t-Butanol | 20.0 | 13.0 | X | 10 |
| Ex. 23 | Styrene 100 mass % | 33 | 6 | t-Butanol | 20.0 | 13.0 | X | 15 |
| Ex. 24 | Styrene 100 mass % | 33 | 4 | t-Butanol | 20.0 | 13.0 | X | 5 |
| Ex. 25 | Styrene 100 mass % | 33 | 8 | t-Butanol | 20.0 | 13.0 | X | 5 |
| Ex. 26 | Styrene 100 mass % | 33 | 10 | t-Butanol | 20.0 | 13.0 | X | 5 |
| Comp. Ex. 1 | Styrene 100 mass % | 33 | 6 | t-Butanol | 20.0 | 13.0 | X | 5 |
| Comp. Ex. 2 | Styrene 100 mass % | 33 | 6 | t-Butanol | 20.0 | 13.0 | X | 3 |
| Comp. Ex. 3 | Styrene 100 mass % | 33 | 6 | t-Butanol | 20.0 | 13.0 | X | 5 |
| Comp. Ex. 4 | Styrene 100 mass % | 33 | 6 | MIBK | 25.4 | 7.6 | X | 5 |
| Comp. Ex. 5 | Styrene 100 mass % | 33 | 6 | Toluene | 27.9 | 5.1 | X | 5 |
| Comp. Ex. 6 | Acryl 100 mass % | 40 | 6 | t-Butanol | 20.0 | 20.0 | X | 5 |
| Comp. Ex. 7 | Acryl 100 mass % | 40 | 6 | MIBK | 25.4 | 14.6 | X | 5 |
| Comp. Ex. 8 | Styrene 25 mass %, Acryl 75 mass % | — | 6 | Toluene | 27.9 | — | X | 5 |
| Comp. Ex. 9 | Styrene 45 mass %, Acryl 55 mass % | — | 6 | Toluene | 27.9 | — | X | 5 |
| Comp. Ex. 10 | Acryl 100 mass % | 40 | 6 | t-Butanol | 20.0 | 20.0 | X | 5 |
| Comp. Ex. 11 | Acryl 100 mass % | 40 | 6 | t-Butanol | 20.0 | 20.0 | X | 20 |
| Comp. Ex. 12 | Styrene 100 mass % | 33 | 6 | t-Butanol | 20.0 | 13.0 | ○ | 5 |
| Comp. Ex. 13 | Styrene 100 mass % | 33 | 6 | t-Butanol | 20.0 | 13.0 | X | 5 |

| | Average coating thickness after dried (μm) | Transparent resin layer Resin Dry curing | Surface roughness RΔq (μm) | Optical properties | | | Agglomeration in in-plane direction | Formation of meniscuses |
|---|---|---|---|---|---|---|---|---|
| | | | | Anti-glare properties | Degree of white muddiness A | Degree of white muddiness B | | |
| Ex. 1 | 6 | — | 0.032 | ○ | 1.1 | 0.7 | ○ | ○ |
| Ex. 2 | 8 | — | 0.022 | ○ | 1.0 | 0.6 | ○ | ○ |
| Ex. 3 | 12 | — | 0.02 | ○ | 1.0 | 0.6 | ○ | ○ |
| Ex. 4 | 15 | — | 0.018 | ○ | 1.1 | 0.7 | ○ | ○ |
| Ex. 5 | 18 | — | 0.015 | ○ | 1.1 | 0.7 | ○ | ○ |
| Ex. 6 | 6 | — | 0.035 | ○ | 1.2 | 0.9 | ○ | ○ |
| Ex. 7 | 6 | ○ | 0.013 | ○ | 0.8 | 0.4 | ○ | ○ |
| Ex. 8 | 6 | — | 0.035 | ○ | 1.2 | 0.9 | ○ | ○ |
| Ex. 9 | 6 | — | 0.038 | ○ | 1.1 | 0.7 | ○ | ○ |
| Ex. 10 | 6 | — | 0.038 | ○ | 1.1 | 0.7 | ○ | ○ |
| Ex. 11 | 6 | — | 0.035 | ○ | 1.0 | 0.6 | ○ | ○ |
| Ex. 12 | 6 | — | 0.038 | ○ | 1.1 | 0.7 | ○ | ○ |
| Ex. 13 | 6 | — | 0.036 | ○ | 1.2 | 0.9 | ○ | ○ |
| Ex. 14 | 6 | — | 0.036 | ○ | 1.1 | 0.7 | ○ | ○ |
| Ex. 15 | 6 | — | 0.039 | ○ | 1.0 | 0.6 | ○ | ○ |
| Ex. 16 | 6 | — | 0.04 | ○ | 1.0 | 0.6 | ○ | ○ |
| Ex. 17 | 6 | — | 0.039 | ○ | 1.1 | 0.7 | ○ | ○ |
| Ex. 18 | 6 | — | 0.037 | ○ | 1.1 | 0.7 | ○ | ○ |
| Ex. 19 | 6 | — | 0.028 | ○ | 0.9 | 0.5 | ○ | ○ |
| Ex. 20 | 6 | — | 0.029 | ○ | 0.9 | 0.5 | ○ | ○ |
| Ex. 21 | 6 | — | 0.015 | ○ | 0.9 | 0.5 | ○ | ○ |
| Ex. 22 | 6 | — | 0.042 | ⊚ | 1.4 | 1.1 | ○ | ○ |
| Ex. 23 | 6 | — | 0.045 | ⊚ | 1.6 | 1.3 | ○ | ○ |
| Ex. 24 | 4 | — | 0.036 | ○ | 1.0 | 0.6 | ○ | ○ |
| Ex. 25 | 8 | — | 0.037 | ○ | 1.1 | 0.7 | ○ | ○ |
| Ex. 26 | 10 | — | 0.036 | ○ | 1.1 | 0.7 | ○ | ○ |
| Comp. Ex. 1 | 4 | — | 0.09 | ⊚ | 2.9 | 2.7 | ○ | ○ |

TABLE 1-continued

| | | | | | | | | |
|---|---|---|---|---|---|---|---|---|
| Comp. Ex. 2 | 6 | — | 0.002 | X | 0.8 | 0.4 | ○ | X |
| Comp. Ex. 3 | 5 | — | 0.07 | ◉ | 2.3 | 2.1 | ○ | ○ |
| Comp. Ex. 4 | 6 | — | 0.1 | ◉ | 3.1 | 2.9 | X | ○ |
| Comp. Ex. 5 | 6 | — | 0.15 | ◉ | 3.5 | 3.4 | X | ○ |
| Comp. Ex. 6 | 6 | — | 0.002 | X | 0.6 | 0.4 | X | ○ |
| Comp. Ex. 7 | 6 | — | 0.002 | X | 0.6 | 0.2 | X | ○ |
| Comp. Ex. 8 | 6 | — | 0.002 | X | 0.6 | 0.2 | X | ○ |
| Comp. Ex. 9 | 6 | — | 0.001 | X | 0.6 | 0.2 | X | ○ |
| Comp. Ex. 10 | 4 | — | 0.002 | X | 0.7 | 0.3 | X | ○ |
| Comp. Ex. 11 | 4 | — | 0.08 | ◉ | 2.5 | 2.3 | X | ○ |
| Comp. Ex. 12 | 6 | — | 0.002 | X | 0.8 | 0.4 | ○ | X |
| Comp. Ex. 13 | 6 | X | 0.001 | X | 0.6 | 0.4 | ○ | X |

In Table 1, degree of white muddiness A and degree of white muddiness B indicate values respectively measured as follows.

Degree of white muddiness A: Degree of white muddiness measured for the anti-glare film having black glass bonded to the back surface.

Degree of white muddiness B: Degree of white muddiness measured for the anti-glare film having a black acrylic sheet bonded to the back surface.

In Table 1, with respect to the dry curing for resin, symbol "x" indicates that the coating composition applied was not cured and remained in the liquid state after the drying step, symbol "○" indicates that the coating composition applied was cured after the drying step, and symbol "-" indicates that there was no transparent resin layer.

In Table 1, the packing ratio means a ratio of the content B of the fine particles to the content A of the resin in the anti-glare layer (B/A×100).

The values in Examples 1 to 26 and Comparative Examples 1 to 13 were individually determined as follows.

Average Thickness of Anti-Glare Layer

An average thickness of the anti-glare layer was measured using a contact-type thickness meter (manufactured and sold by TESA Corporation).

Average Particle Diameter of Fine Particles

An average particle diameter of the fine particles was determined by measuring a particle diameter by means of a Coulter Multisizer and obtaining an average of the resultant data.

Surface Tension of Solvent

A surface tension of the solvent was determined by, for example, a wilhelmy method in which a wilhelmy plate and a liquid sample are brought into contact with each other to apply a strain and force for drawing the wilhelmy plate into the liquid is measured. As a measuring apparatus, Rheo-Surf, manufactured and sold by UBM Corporation, which is a dynamic surface tension measuring machine, was used. The measurement was conducted under conditions such that the solvent temperature and the ambient temperature were the same. Specifically, the solvent was allowed to stand in an environment at an ambient temperature of 25° C., and the solvent temperature reached 25° C. and then a surface tension of the solvent was measured.

Surface Energy of Fine Particles

The fine particles were pressed into a plate form by means of a pressing machine, and then a liquid was put on the surface of the resultant plate to determine a critical surface tension, and the value determined was used as surface energy of the fine particles. The measurement was conducted in an environment at 25° C. like the above measurement of surface tension of the solvent.

From Table 1, the following findings are obtained.

With respect to the anti-glare films in Examples 1 to 7 and 21 to 26 in which fine particles composed of styrene are used in the anti-glare layer and a solvent having a surface tension of 23 mN/m or less is used and the anti-glare films in Examples 8 to 20 in which fine particles composed of an acryl (10% by mass)-styrene (90% by mass) copolymer, acryl (30% by mass)-styrene (70% by mass) copolymer, or acryl (40% by mass)-styrene (60% by mass) copolymer are used, the root mean square slope RΔq falls in the range of 0.003 to 0.05 and both the anti-glare properties and degree of white muddiness are excellent. With respect to the anti-glare films in Comparative Examples 1 and 3 in which the dried coating thickness is smaller than the average particle diameter of the fine particles and the anti-glare films in Comparative Examples 4 and 5 in which the surface energy of the fine particles is relatively smaller than the surface tension of the solvent, the RΔq value is large and hence the anti-glare properties are excellent, but the degree of white muddiness is large and the contrast is lowered. On the other hand, with respect to the anti-glare films in Comparative Examples 6 to 10 in which the surface energy of the fine particles is relatively larger than the surface tension of the solvent, the RΔq value is small and hence the degree of white muddiness is small, but the anti-glare properties are poor. In Comparative Example 11 in which the amount of the fine particles is increased and the dried coating thickness is smaller than the average particle diameter of the fine particles, the anti-glare film has anti-glare properties and large degree of white muddiness like a conventional anti-glare film. With respect to the anti-glare film in Comparative Example 12 in which a dry curing resin is used, the RΔq value is small and hence the degree of white muddiness is small, but the anti-glare properties are poor. As can be seen from Comparative Example 2, when the amount of the fine particles is 3% by mass, the flat portions are increased and hence the degree of white muddiness is small, but anti-glare properties are difficult to obtain. Therefore, as seen in Examples 21 to 23, the amount of the fine particles is preferably 4% by mass or more.

When the styrene fine particles having a surface energy of 33 mN/m or the acrylic fine particles having a surface energy of 40 mN/m are used, the difference between the surface energy of the fine particles and the surface tension of the solvent is small, and, as seen in Comparative Example 4, when the difference between the surface energy of the fine particles and the surface tension of the solvent is less than 8 mN/m, the fine particles are three-dimensionally agglomerated markedly during the drying to form a remarkably surface irregularities, and the resultant film has scintillation, high anti-glare properties, and low contrast.

When the difference is larger and, as seen in Examples 1 and 6, the difference between the surface energy of the fine particles and the surface tension of the solvent is in the range of 8 to 13 mN/m, Benard cells are formed due to the fine particles arranged on the plane also after the drying to form a moderate surface waviness, and the resultant film has low anti-glare properties and high contrast.

When the difference is further larger and, as seen in Comparative Examples 6 and 10, the difference between the surface energy of the fine particles and the surface tension of the solvent is more than 13 mN/m, Benard cells are unlikely to be formed in the surface after the drying, and the resultant film has many flat portions and hence has low anti-glare properties. Thus, for achieving anti-glare properties while having the above relationship, it would be necessary that the coating composition is at a thickness smaller than the particle diameter of the fine particles, and for eliminating flat portions, it would be necessary that the fine particles are added in a large amount. As a result, the resultant film becomes to have a large degree of white muddiness and low contrast.

As apparent from the above results, by appropriately selecting the difference between the surface energy of the fine particles and the surface tension of the solvent and using a resin which is not cured after the drying, the formation of Benard cells in the surface of the anti-glare layer are controlled to obtain desired roughness, making it possible to obtain an anti-glare film having a reduced degree of white muddiness while keeping the anti-glare properties.

From Example 7, it has been found that, by forming a transparent resin layer containing a dry curing resin, an anti-glare film having a degree of white muddiness further reduced can be obtained. In Comparative Example 13 in which a resin, which is not curable by drying, was used in the transparent resin layer, the RΔq value was small and the anti-glare properties were poor. As apparent from this, by forming a transparent resin layer using a dry curing resin, there may be obtained an anti-glare film having more excellent contrast than that of the anti-glare film having no transparent resin layer while maintaining excellent anti-glare properties.

Examples 27 to 31

Anti-glare films were individually obtained in substantially the same manner as in Examples 1 to 5 except that the amount of the styrene fine particles was changed to 400 grams.

Examples 32 to 35

Anti-glare films were individually obtained in substantially the same manner as in Examples 1 to 5 except that the amount of the styrene fine particles was changed to 480 grams.

Anti-Glare Properties

With respect to each of the anti-glare films obtained as described above in Examples 1 to 5 and 27 to 35, anti-glare properties were evaluated as follows.

Two fluorescent lamps were reflected off the surface of the anti-glare layer, and the visibility of the reflection of the lamps was evaluated in accordance with the following five criteria.

Level 5: Two fluorescent lamps are seen as single light, and the shapes of the lamps cannot be recognized.

Level 4: Two fluorescent lamps can be seen, but the shapes of the lamps cannot be recognized.

Level 3: Two separate fluorescent lamps and indistinct edges of the lamps can be seen, and the shapes of the fluorescent lamps can be recognized.

Level 2: Two separate fluorescent lamps can be seen clearly, and the edges of the lamps can be seen.

Level 1: Two separate fluorescent lamps can be seen clearly, and the distinct edges of the lamps can be recognized.

TABLE 2

| | Particle packing ratio | Coating thickness | Level of anti-glare properties |
|---|---|---|---|
| Example 1 | 5% | 6 μm | 5 |
| Example 2 | 5% | 8 μm | 4 |
| Example 3 | 5% | 12 μm | 3 |
| Example 4 | 5% | 15 μm | 3 |
| Example 5 | 5% | 18 μm | 2 |
| Example 27 | 10% | 6 μm | 5 |
| Example 28 | 10% | 8 μm | 4 |
| Example 29 | 10% | 12 μm | 4 |
| Example 30 | 10% | 15 μm | 3 |
| Example 31 | 10% | 18 μm | 3 |
| Example 32 | 12% | 6 μm | 5 |
| Example 33 | 12% | 8 μm | 4 |
| Example 34 | 12% | 12 μm | 4 |
| Example 35 | 12% | 15 μm | 5 |

As can be seen from Table 2, when the particle packing ratio is more than 10%, the dependency of the anti-glare properties on the coating thickness is likely to be small, making it difficult to control the anti-glare properties by changing the coating thickness.

Next, a correlation between the degree of white muddiness measured for the anti-glare film having a black glass sheet bonded and the degree of white muddiness measured for the anti-glare film having a black acrylic sheet bonded is described with reference to Table 3 and FIG. 7.

TABLE 3

| | Degree of white muddiness (measured) through glass sheet | Degree of white muddiness (measured) through acrylic sheet | Degree of white muddiness (calculated) through acrylic sheet |
|---|---|---|---|
| Experimental Example 1 | 2.6 | 2.3 | 2.3 |
| Experimental Example 2 | 2.0 | 1.8 | 1.7 |
| Experimental Example 3 | 0.9 | 0.5 | 0.5 |
| Experimental Example 4 | 0.9 | 0.6 | 0.5 |
| Experimental Example 5 | 1.0 | 0.6 | 0.6 |
| Experimental Example 6 | 1.0 | 0.6 | 0.6 |
| Experimental Example 7 | 1.7 | 1.5 | 1.4 |
| Experimental Example 8 | 1.2 | 0.8 | 0.9 |
| Experimental Example 9 | 1.3 | 0.9 | 1.0 |

TABLE 3-continued

|  | Degree of white muddiness (measured) through glass sheet | Degree of white muddiness (measured) through acrylic sheet | Degree of white muddiness (calculated) through acrylic sheet |
|---|---|---|---|
| Experimental Example 10 | 1.1 | 0.7 | 0.7 |
| Experimental Example 11 | 1.2 | 0.8 | 0.8 |
| Experimental Example 12 | 1.0 | 0.6 | 0.6 |
| Experimental Example 13 | 1.0 | 0.6 | 0.6 |
| Experimental Example 14 | 0.9 | 0.4 | 0.5 |

With respect to the anti-glare films in Experimental Examples 1 to 14 obtained by changing the degree of white muddiness by appropriately controlling the thickness and particle diameter in Example 1, the results of measurement of the degree of white muddiness for the black glass sheet bonded anti-glare films and the black acrylic sheet bonded anti-glare films are shown in Table 3. In addition, with respect to the degree of white muddiness for the anti-glare films through an acrylic sheet, values determined by making a calculation using a regression line obtained from the correlation between a black glass sheet and a black acrylic sheet are shown in Table 3. As can be seen from Table 3, values near the measured values can be obtained by the calculation.

Figure 7:
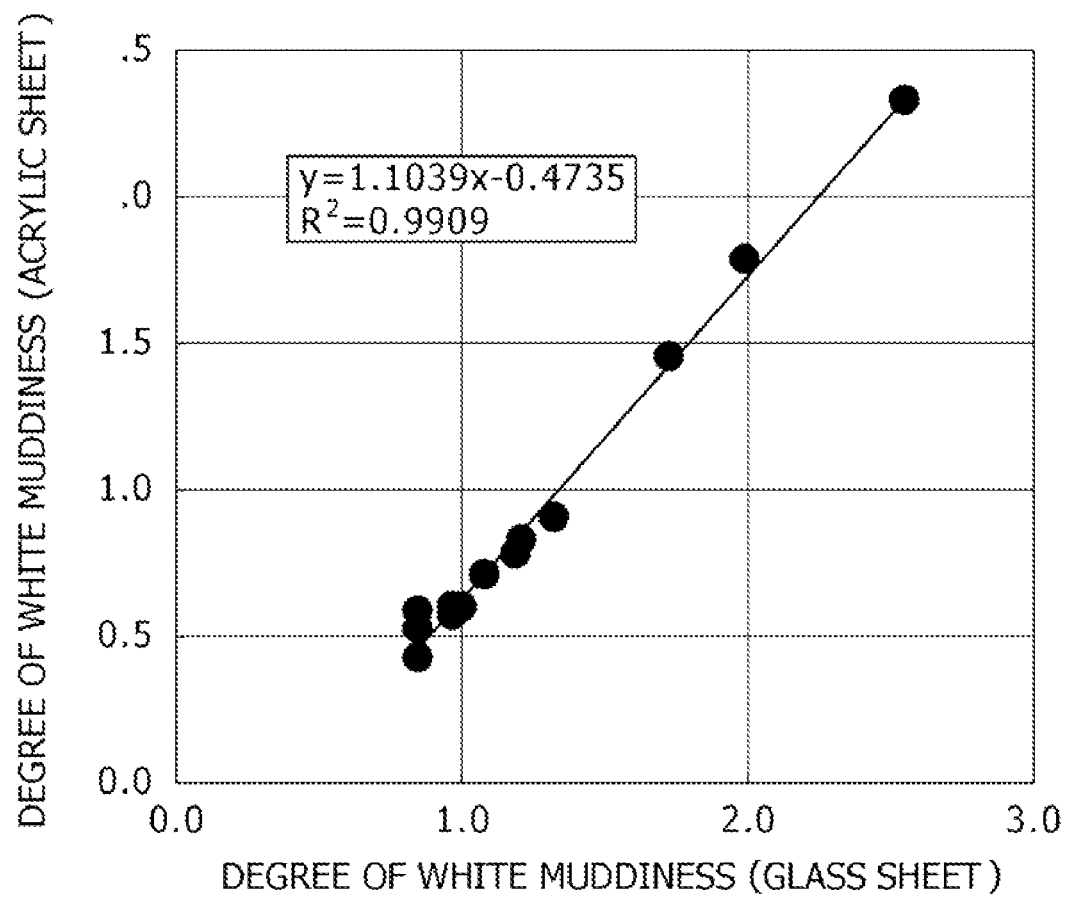
FIG. 7 is a graph for explaining the correlation between a degree of white muddiness as measured using a black glass sheet and a degree of white muddiness as measured using a black acrylic sheet.
Figure 8:
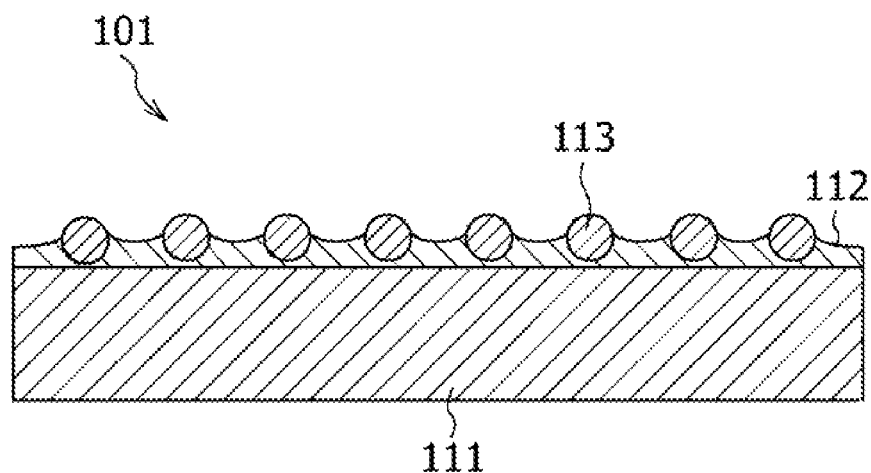
FIG. 8 is a diagrammatic cross-sectional view showing an example of the construction of a conventional anti-glare film.
Figure 9:
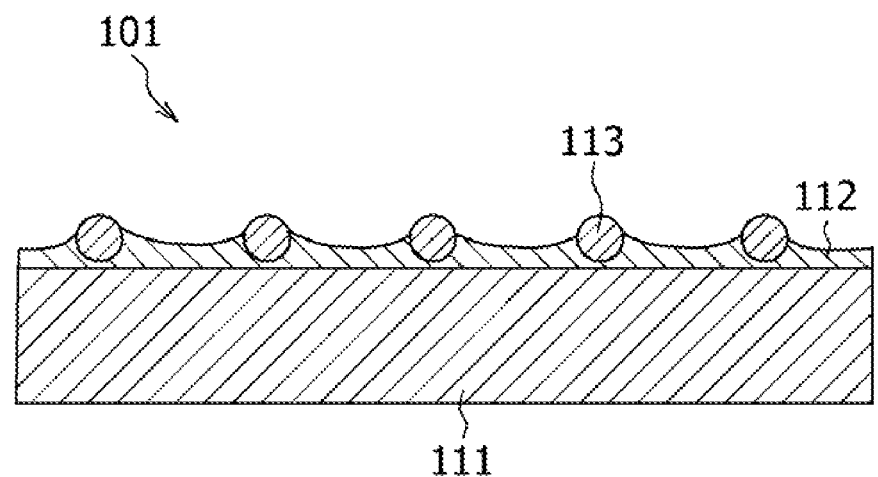
FIG. 9 is a diagrammatic cross-sectional view showing an example of the construction of a conventional anti-glare film.

A regression line from the correlation between a black glass sheet and a black acrylic sheet is obtained by, as shown in FIG. 7, plotting a degree of white muddiness for the black glass sheet bonded anti-glare film on the abscissa and a degree of white muddiness for the black acrylic sheet bonded anti-glare film on the ordinate. In FIG. 7, when a degree of white muddiness for the glass sheet bonded anti-glare film is taken as x and a degree of white muddiness for the acrylic sheet bonded anti-glare film is taken as y, a regression line represented by the following formula (2):

$$y = 1.1039x - 0.4735 \quad (2)$$

is obtained, and a determining coefficient $R^2$ is 0.9909. From the above, it is found that there is a close correlation between a degree of white muddiness as measured using a black glass sheet and a degree of white muddiness as measured using a black acrylic sheet.

Embodiments and Examples of the present application are described above in detail, but the present application is not limited to the above embodiments and Examples, where suitable modifications are contemplated.

For example, the values described in the above embodiments and Examples are merely examples, and values different from them can be used if desired.

In a first embodiment above, an embodiment is described in which the anti-glare film is used in a liquid crystal display device, but the application of the anti-glare film is not limited to a liquid crystal display. The anti-glare film can be applied to various display devices, such as a plasma display, an electroluminescence display, and a cathode ray tube (CRT) display.

According to an embodiment, an anti-glare film having both excellent anti-glare properties and excellent contrast is produced by forming Benard cells in the surface of the anti-glare layer. Further, according to embodiments of the present invention, an anti-glare film having both excellent anti-glare properties and excellent contrast is produced using a process in which a coating composition is applied to a substrate, and therefore an anti-glare film having high quality is obtained with high productivity at low cost.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method for producing an anti-glare film, comprising:
applying a coating composition to a substrate, the coating composition including at least a resin, a solvent, and fine particles;
drying the coating composition applied to the substrate to form a Benard cell structure in a surface of the coating layer by convection caused during volatilization of the solvent; and
curing the resin contained in the coating composition including the formed Benard cell structure to form an anti-glare layer having fine irregularities with a moderate surface waviness,
wherein the anti-glare layer has a dried average coating thickness in the range of from an average particle diameter of the fine particles to three times the average particle diameter of the fine particles, and
wherein the anti-glare layer has a degree of white muddiness of 1.7 or less, as measured by quantitatively determining a diffuse reflection component of the diffused light incident upon the surface of the anti-glare layer.

2. The method according to claim 1,
wherein the fine particles are composed mainly of an acryl-styrene copolymer.

3. The method according to claim 1,
wherein, in the coating composition drying step, the fine particles are agglomerated mainly in the in-plane direction by the convection caused during volatilization of the solvent.

4. The method according to claim 3,
wherein the agglomerated fine particles are covered with the resin in the surface of the anti-glare layer.

5. The method according to claim 1,
wherein the resin is an ionizing radiation-curable resin, a thermosetting resin, or a mixed resin thereof and contains at least one of a monomer, an oligomer, and a polymer, which remains in the liquid state after drying the coating composition.

6. The method according to claim 1,
wherein, in the resin curing step, the resin is cured by ionizing radiation or heating in such a state that a Benard cell structure is formed in the surface.

7. The method according to claim 1,
wherein the fine particles are covered with the resin and do not protrude from a surface of the anti-glare layer.

8. A method for producing an anti-glare film, comprising:
applying a coating composition to a substrate, the coating composition including at least a resin, a solvent, and fine particles;
drying the coating composition applied to the substrate to fond a Benard cell structure in a surface of the coating layer by convection caused during volatilization of the solvent; and
curing the resin contained in the coating composition including the formed Benard cell structure to form an anti-glare layer having fine irregularities with a moderate surface waviness, wherein the anti-glare layer has a dried average coating thickness in the range of from an average particle diameter of the fine particles to three times the average article diameter of the fine particles, wherein the fine particles are organic fine particles, and wherein a difference between a surface energy of the organic fine particles and a surface tension of the solvent is 8 mN/m to 13 mN/m.

9. A method for producing an anti-glare film, comprising:

applying a coating composition to a substrate, the coating composition including at least a resin, a solvent, and fine particles;

drying the coating composition applied to the substrate to form a Benard cell structure in a surface of the coating layer by convection caused during volatilization of the solvent; and curing the resin contained in the coating composition including the formed Benard cell structure to form an anti-glare layer having fine irregularities with a moderate surface waviness, wherein the anti-glare layer has a dried average coating thickness in the range of from an average particle diameter of the fine particles to three times the average particle diameter of the fine particles, wherein the fine particles are composed mainly of styrene, and the solvent has a surface tension of 23 mN/m or less.

10. A method for producing an anti-glare film, comprising:

applying a coating composition to a substrate, the coating composition including at least a resin, a solvent, and fine particles;

drying the coating composition applied to the substrate to form a Benard cell structure in a surface of the coating layer by convection caused during volatilization of the solvent; and curing the resin contained in the coating composition including the formed Benard cell structure to form an anti-glare layer having fine irregularities with a moderate surface waviness, wherein the anti-glare layer has a dried average coating thickness in the range of from an average particle diameter of the fine particles to three times the average particle diameter of the fine particles, wherein the acryl-styrene copolymer includes 60 mass percent to 90 mass percent of a styrene component and 10 mass percent to 40 mass percent of an acryl component, and wherein the fine particles are composed mainly of an acryl-styrene copolymer.

11. A method for producing an anti-glare film, comprising:

applying a coating composition to a substrate, the coating composition including at least a resin, a solvent, and fine particles;

drying the coating composition applied to the substrate to form a Benard cell structure in a surface of the coating layer by convection caused during volatilization of the solvent; and curing the resin contained in the coating composition including the formed Benard cell structure to form an anti-glare layer having fine irregularities with a moderate surface waviness, wherein the anti-glare layer has a dried average coating thickness in the range of from an average particle diameter of the fine particles to three times the average particle diameter of the fine particles, wherein the anti-glare layer has a packing ratio for the fine particles of 4 to 10%.

12. A method for producing an anti-glare film, comprising:

applying a coating composition to a substrate, the coating composition including at least a resin, a solvent, and fine particles;

drying the coating composition applied to the substrate to form a Benard cell structure in a surface of the coating layer by convection caused during volatilization of the solvent; and curing the resin contained in the coating composition including the formed Benard cell structure to form an anti-glare layer having fine irregularities with a moderate surface waviness, wherein the anti-glare layer has a dried average coating thickness in the range of from an average particle diameter of the fine particles to three times the average particle diameter of the fine particles, wherein the anti-glare layer has a surface having a root mean square slope $R\Delta q$ of 0.003 to 0.05.

13. A method for producing an anti-glare film, comprising:

applying a coating composition to a substrate, the coating composition including at least a resin, a solvent, and fine particles;

drying the coating composition applied to the substrate to form a Benard cell structure in a surface of the coating layer by convection caused during volatilization of the solvent; and curing the resin contained in the coating composition including the formed Benard cell structure to form an anti-glare layer having fine irregularities with a moderate surface waviness, wherein the anti-glare layer has a dried average coating thickness in the range of from an average particle diameter of the fine particles to three times the average particle diameter of the fine particles, after the resin curing step, applying a coating composition to the anti-glare layer, the coating composition including at least a resin and a solvent; and drying and curing the coating composition applied to the anti-glare layer to form a transparent resin layer on the anti-glare layer.

14. The method according to claim 13, wherein the coating composition applied to the anti-glare layer covers protruding portions in the surface of the anti-glare layer to reduce the slope near the particles.

15. The method according to claim 13, wherein the resin contained in the coating composition applied to the anti-glare layer includes a dry curing resin which is changed to be in a solid state after being dried.

* * * * *